United States Patent
Meng

(10) Patent No.: US 12,508,998 B2
(45) Date of Patent: Dec. 30, 2025

(54) METHODS, SYSTEMS, AND DEVICES FOR MONITORING A PORTABLE SPEAKER OF A VEHICLE

(71) Applicant: Toyota Motor Engineering & Manufacturing North America, Inc., Plano, TX (US)

(72) Inventor: Ming M. Meng, Novi, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 151 days.

(21) Appl. No.: 18/595,022

(22) Filed: Mar. 4, 2024

(65) Prior Publication Data
US 2025/0276656 A1 Sep. 4, 2025

(51) Int. Cl.
| B60R 11/02 | (2006.01) |
| H04R 1/02 | (2006.01) |
| B60R 11/00 | (2006.01) |

(52) U.S. Cl.
CPC ............ B60R 11/0217 (2013.01); H04R 1/02 (2013.01); *B60R 2011/0005* (2013.01); *B60R 2011/0075* (2013.01); *B60R 2011/0098* (2013.01); *H04R 2420/07* (2013.01); *H04R 2499/13* (2013.01)

(58) Field of Classification Search
CPC ......... B60R 11/0217; B60R 2011/0005; B60R 2011/0075; B60R 2011/0098; H04R 1/02; H04R 2420/07; H04R 2499/13

USPC ...................................................... 340/426.34
See application file for complete search history.

(56) References Cited

U.S. PATENT DOCUMENTS

| 8,094,831 B2 | 1/2012 | Feit |
| 8,428,292 B2 * | 4/2013 | Shaffer .................. H04R 1/028 381/86 |
| 8,477,953 B2 | 7/2013 | Hobson et al. |
| 9,749,734 B2 * | 8/2017 | Wippler .................. H04R 1/26 |

(Continued)

FOREIGN PATENT DOCUMENTS

| CN | 205305096 U | 6/2016 |
| CN | 206894865 U | 1/2018 |

(Continued)

*Primary Examiner* — Kerri L Mcnally
(74) *Attorney, Agent, or Firm* — Snell & Wilmer LLP

(57) ABSTRACT

Methods, systems, and devices for a portable speaker security system. The portable speaker security system may include a portable speaker and a speaker dock. The speaker dock may hold the portable speaker and electrically connect to the portable speaker. The portable speaker security system may further include a head unit electrically connected to the speaker dock. The head unit may indicate a disconnect when the portable speaker is electrically disconnected from the speaker dock. The portable speaker security system may further include a network access device. The network access device may wirelessly communicate with a mobile device. The portable speaker security system may further include an electronic control unit (ECU) electrically connected to the speaker dock, the head unit, and the network access device. The ECU may transmit a message to the mobile device indicating the portable speaker has been disconnected from the speaker dock when the disconnect is indicated.

20 Claims, 5 Drawing Sheets

(56) References Cited

U.S. PATENT DOCUMENTS

| | | | |
|---|---|---|---|
| 10,063,973 B2* | 8/2018 | Mezzomo | H04R 1/026 |
| 10,097,922 B2 | 10/2018 | Fathollahi | |
| 11,679,725 B2 | 6/2023 | Ludwig et al. | |
| 12,415,470 B2* | 9/2025 | Glaser | B60R 16/0231 |
| 2017/0251305 A1* | 8/2017 | Fathollahi | G06F 3/162 |
| 2019/0080265 A1 | 3/2019 | Asada | |
| 2019/0122511 A1 | 4/2019 | Hicks | |
| 2020/0130603 A1* | 4/2020 | Berg | B60R 11/04 |
| 2021/0237659 A1* | 8/2021 | Ludwig | H04R 9/022 |
| 2023/0042118 A1* | 2/2023 | Hayashi | H02J 7/0044 |

FOREIGN PATENT DOCUMENTS

| | | |
|---|---|---|
| CN | 111083598 A | 4/2020 |
| DE | 102017201961 A1 | 8/2018 |
| KR | 101628865 B1 | 6/2016 |
| KR | 101926450 B1 | 12/2018 |

* cited by examiner

METHODS, SYSTEMS, AND DEVICES FOR MONITORING A PORTABLE SPEAKER OF A VEHICLE

BACKGROUND

1. Field

The present disclosure relates to methods, systems, and/or devices for monitoring a portable speaker of a vehicle.

2. Description of the Related Art

Various modern vehicles may include and/or be equipped with a portable speaker (e.g., a portable Bluetooth® speaker). The inclusion of the portable speaker provides convenience to car owners by giving the flexibility of stowing and/or charging the portable speaker within the vehicle but also allowing the car owners to remove the portable speaker from the vehicle (e.g., to use during camping, picnics, hiking, etc.). However, this convenience also presents the risk of the portable speaker being stolen. The risk is especially present with vehicles that may include removable doors and/or a removable roof. Current vehicles do not have systems to monitor a portable speaker to prevent theft of the portable speaker.

Accordingly, it is desirable to provide methods, systems, and devices for monitoring and/or securing a portable speaker of a vehicle.

SUMMARY

In general, one aspect of the subject matter described in this disclosure may be embodied in a portable speaker security system for a vehicle. The portable speaker security system may include a portable speaker. The portable speaker security system may further include a speaker dock located on or within the vehicle. The speaker dock may hold the portable speaker and electrically connect to the portable speaker. The portable speaker security system may further include a head unit electrically connected to the speaker dock. The head unit may transmit audio data to the portable speaker through the speaker dock and/or wirelessly transmit the audio data to the portable speaker. The head unit may further indicate a disconnect when the portable speaker is electrically disconnected from the speaker dock. The portable speaker security system may further include a network access device. The network access device may wirelessly communicate with at least one mobile device. The portable speaker security system may further include an electronic control unit (ECU) electrically connected to the speaker dock, the head unit, and the network access device. The ECU may transmit, via the network access device, a message to the at least one mobile device indicating the portable speaker has been disconnected from the speaker dock when the disconnect is indicated.

In one aspect, the subject matter may be embodied in a portable speaker security system for a vehicle. The portable speaker security system may include a portable speaker. The portable speaker security system may further include a speaker dock located on or within the vehicle. The speaker dock may hold the portable speaker and electrically connect to the portable speaker. The portable speaker security system may further include a network access device. The network access device may wirelessly communicate with at least one mobile device. The portable speaker security system may further include at least one camera. The at least one camera may record an image or a video of a surrounding area of the vehicle or an area within a cabin of the vehicle. The portable speaker security system may further include an electronic control unit (ECU) electrically connected to the speaker dock, the network access device, and the at least one camera. The ECU may indicate a disconnect when the portable speaker is electrically disconnected from the speaker dock. The ECU may further record, via the at least one camera, the image or the video of the surrounding area of the vehicle or the cabin of the vehicle when the disconnect is indicated. The ECU may further transmit, via the network access device, a message to the at least one mobile device indicating the portable speaker has been disconnected from the speaker dock when the disconnect is indicated.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are methods, systems, devices, and/or vehicles for implementing a portable speaker security system. Particular embodiments of the subject matter described in this disclosure may be implemented to realize one or more of the following advantages. The portable speaker security system may prevent the unauthorized taking and/or theft of a portable speaker included with and/or located within a vehicle. The portable speaker security system may monitor an electrical connection between the portable speaker and a speaker dock located within the vehicle to determine whether the portable speaker has been removed from the speaker dock. To monitor the electrical connection, a sensor of the portable speaker security system may continuously determine, measure, and/or detect an impedance of the portable speaker. The portable speaker security system may indicate a disconnect in the electrical connection based on the impedance of the portable speaker. When the disconnect is indicated, the portable speaker security system may transmit a message to one or more user devices to notify a user (i.e., an owner and/or authorized user of the vehicle) that the portable speaker has been disconnected from the speaker dock. Hence, the portable speaker security system can advantageously determine if the portable speaker has been misplaced or not on or properly connected to the speaker dock.

Moreover, the portable speaker security system may activate an alarm of the vehicle when the disconnect is indicated to stop the theft of the portable speaker and/or to notify people within the surrounding area of the vehicle to enhance security of the portable speaker. In examples, the message transmitted to the one or more user devices may provide the user an option to activate and/or deactivate the alarm. In the same and/or additional examples, the message may further include an option to notify the police of the theft of the portable speaker and provide the police with a current location of the vehicle and/or a current location of the portable speaker.

Moreover, the portable speaker security system may further enhance security of the portable speaker by including one or more cameras that may record images and/or video of an area within a cabin of the vehicle and/or a surrounding area of the vehicle when the disconnect is indicated. The images and/or the video may track one or more persons running away from the vehicle after the theft has been detected. The images and/or the video may be included in the message that is transmitted to the one or more user devices. The images and/or the video may assist the user and/or the police by showing what happened and/or who removed the portable speaker from the vehicle.

Figure 1:
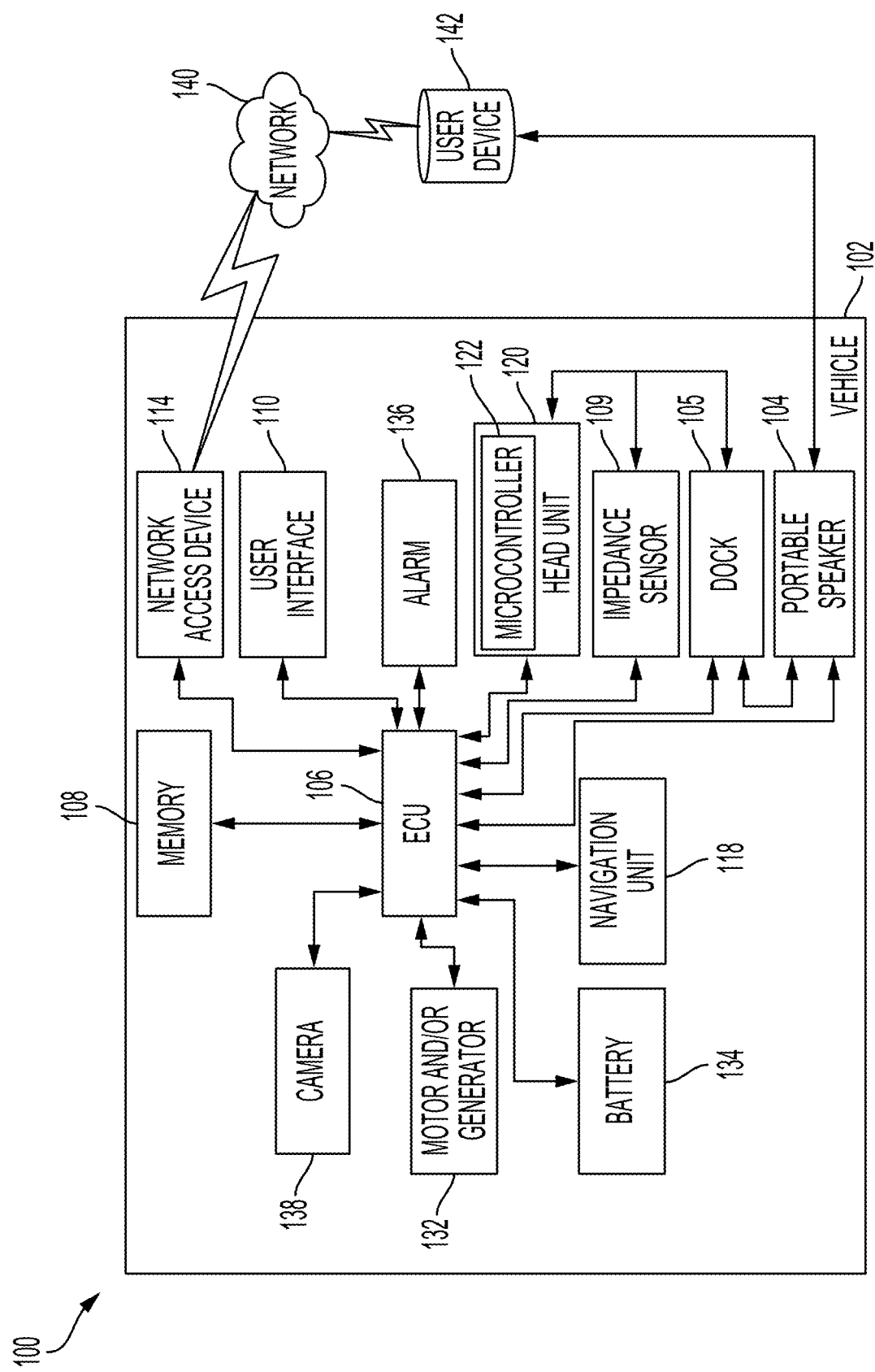
FIG. 1 is a block diagram of an example portable speaker security system for a vehicle according to an aspect of the disclosure.

FIG. 1 is a block diagram of an example portable speaker security system 100 (also can be referred to as a portable device security system 100). The portable speaker security system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The portable speaker security system 100 and/or the vehicle 102 may include a motor and/or generator 132 and a battery 134. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the portable speaker security system 100. Accordingly, the motor and/or generator 132 can cause the vehicle 102 to accelerate, decelerate, or maintain a desired velocity. It should be understood that the motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the portable speaker security system 100.

The portable speaker security system 100 may further include an alarm device 136. The alarm device 136 may be located within the vehicle 102. The alarm device 136 may be an integrated alarm system of the vehicle 102 and may be and/or include a horn of the vehicle 102 and/or one or more lights of the vehicle 102. When activated, the alarm device 136 may continuously and/or repeatedly generate sound (e.g., by sounding the horn of the vehicle 102) and/or may flash the one or more lights of the vehicle 102.

Figure 2A:
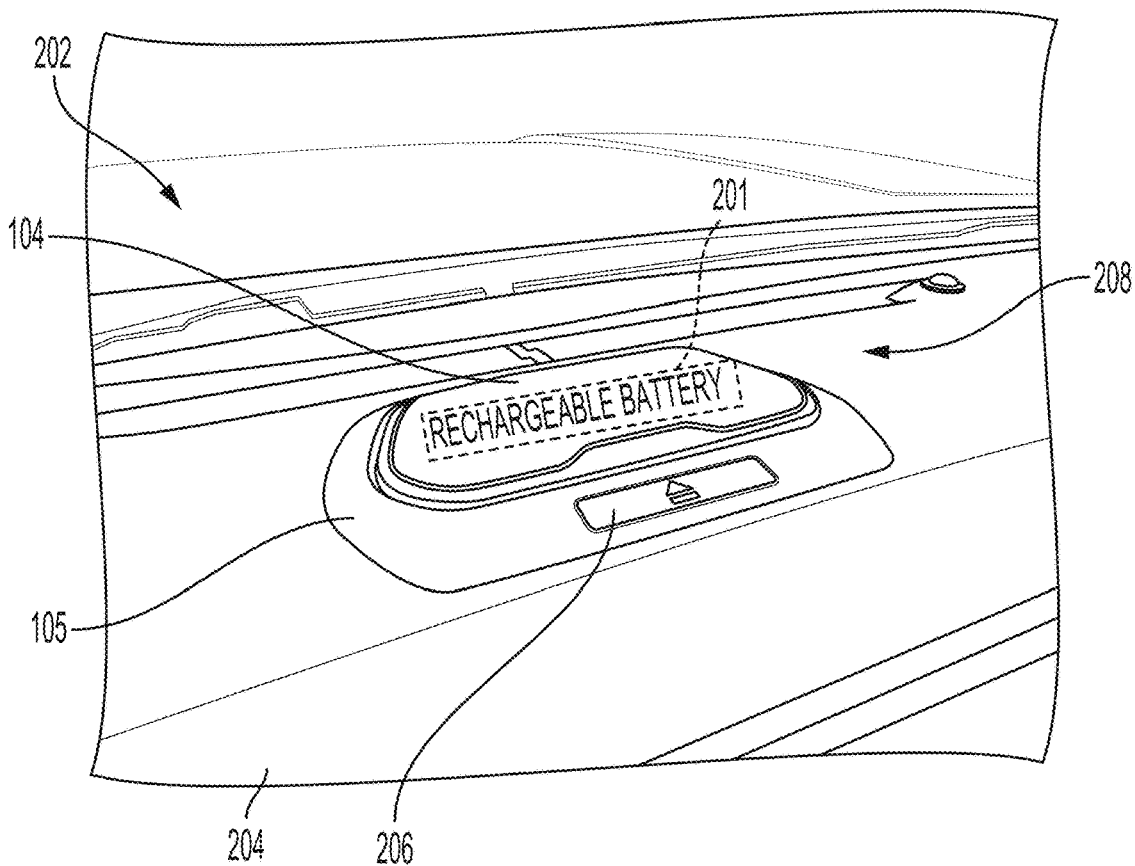
FIG. 2A is a schematic perspective view of a portable speaker of the example portable speaker security system of FIG. 1 in a docked state according to an aspect of the disclosure.
Figure 2B:
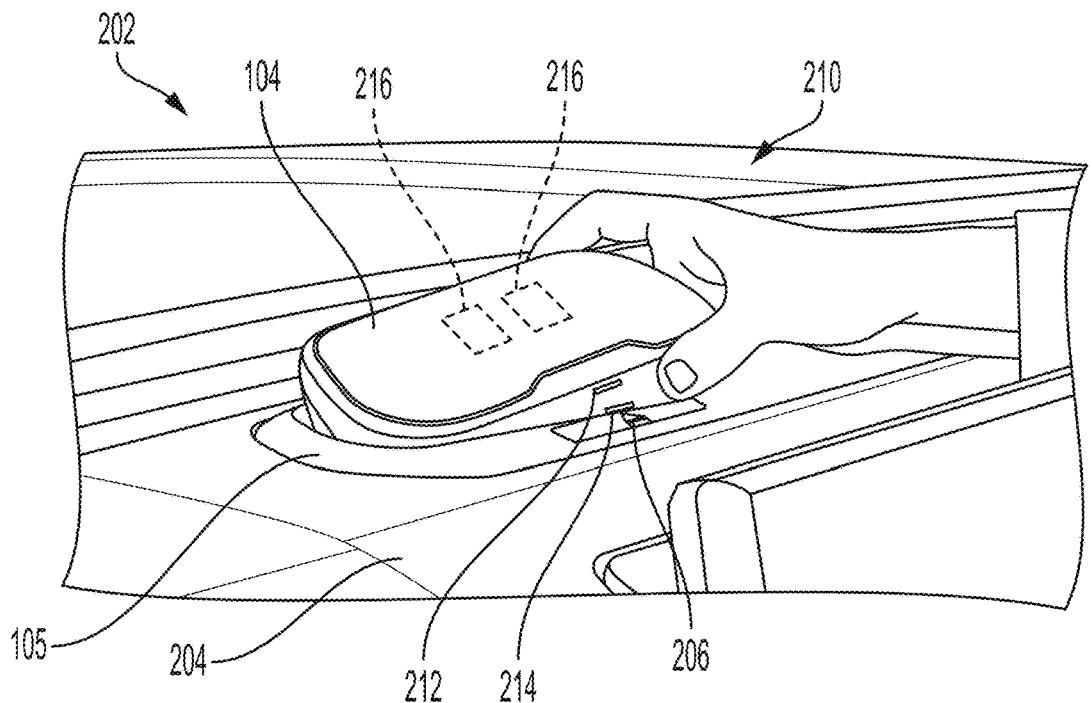
FIG. 2B is a schematic perspective view of a portable speaker of the example portable speaker security system of FIG. 1 in an undocked state according to an aspect of the disclosure.

FIGS. 2A and 2B are schematic perspective views of a portion of the example portable speaker security system 100 of FIG. 1 within a cabin 202 of the vehicle 102. With combined reference to FIGS. 1, 2A, and 2B, the portable speaker security system 100 may further include a portable speaker 104 and a dock 105 (e.g., a speaker dock).

The portable speaker 104 may be removably coupled to the dock 105. The portable speaker 104 may be located within the cabin 202 and/or a dashboard 204 of the vehicle 102 and may be moved to outside the cabin 202 by a user. For example, the portable speaker 104 can be positioned within the dashboard 204 so that the speaker 104 is flush with a top surface of the dashboard 204 when inserted and connected. The portable speaker 104 may be a wireless speaker configured to receive audio data wirelessly (e.g., via Bluetooth®, Wi-Fi, and/or other wireless technologies) from one or more user devices 142 (e.g., a mobile phone, a laptop, a tablet, etc.) and/or over a wired connection (e.g., via an audio data port) from the one or more user devices 142 and/or the vehicle 102. The portable speaker 104 may include a rechargeable battery 201 for powering the portable speaker 104.

The portable speaker 104 may have a docked state (or position) 208, as shown by FIG. 2A, and an undocked state (or position) 210, as shown by FIG. 2B. The portable speaker 104 may receive electrical energy for charging the rechargeable battery 201 of the portable speaker 104 and/or audio data from the dock 105 when the portable speaker 104 is in the docked state 208. In examples, the portable speaker 104 may include one or more terminals (or electrical contacts) 216 for receiving the electrical energy and/or the audio data from the dock 105. The one or more terminals 216 of the portable speaker 104 may be and/or include one or more power connectors and/or one or more audio (or data) connectors. The portable speaker 104 may be placed in the dock 105 and may be held within the dock 105. In examples, the portable speaker 104 may include one or more receiving portions 212 configured to receive and/or interface with one or more tabs (or retention tabs) 214 of the dock 105 to hold the portable speaker 104 within the dock 105. The one or more receiving portions 212 may include a magnet, a fastener, or a clip to hold the portable speaker 104 within the dock 105.

Figure 3:
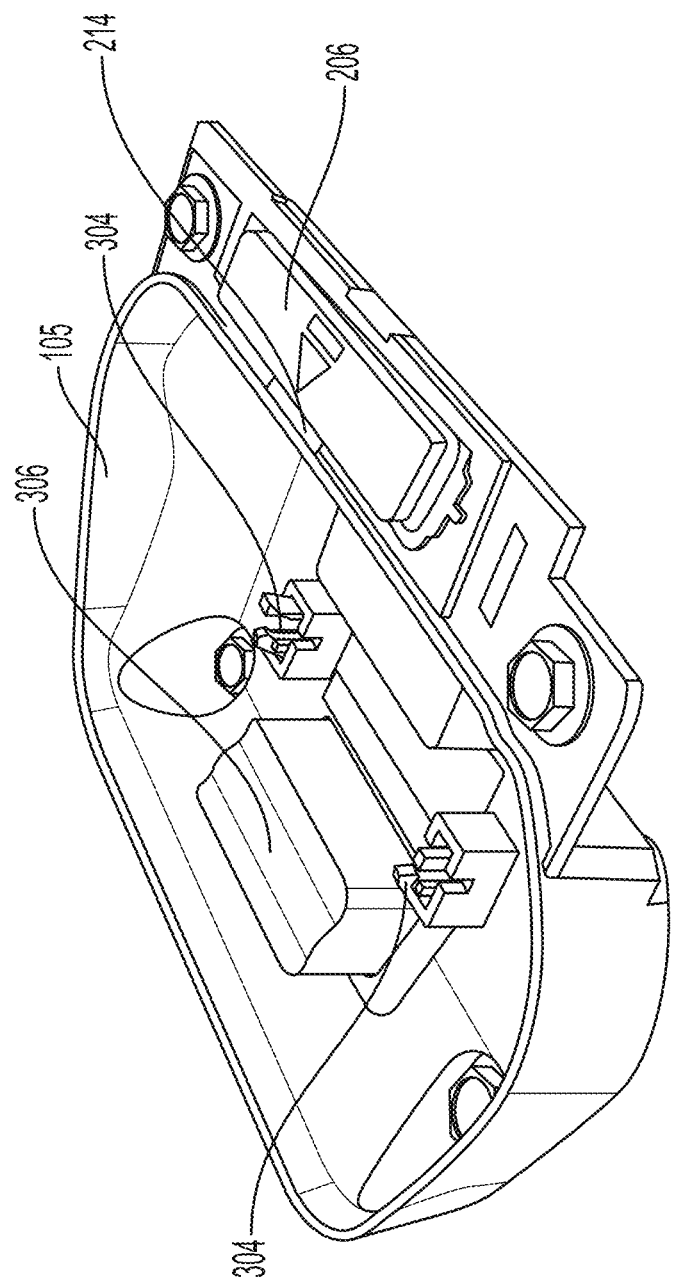
FIG. 3 is a schematic perspective view of a dock of the example portable speaker security system of FIG. 1 according to an aspect of the disclosure.

FIG. 3 is a schematic perspective view of the dock 105 of the portable speaker security system 100. With combined reference to FIGS. 2A, 2B, and 3, the dock 105 may be coupled to the dashboard 204 and/or located within the cabin 202 of the vehicle 102. The dock 105 may receive, hold, secure, and/or release the portable speaker 104 to removably couple the portable speaker 104 to the dashboard 204 and/or the cabin 202 of the vehicle 102. The dock 105 may include one or more terminals (or electrical contacts) 304 for providing the electrical energy and/or the audio data to the portable speaker 104. The one or more terminals 304 of the dock 105 may be and/or include one or more power connectors and/or one or more audio (or data) connectors for providing the electrical energy and/or the audio data to the portable speaker 104. The one or more terminals 304 of the dock 105 may electrically connect with the one or more terminals 216 of the portable speaker 104 when the portable speaker 104 is in the docked state 208.

To release the portable speaker 104 from the dock 105, a user may press on a release button 206 of the dock 105, as shown by FIG. 2B. In examples, when the release button 206 is pressed, the one or more tabs 214 of the dock 105 may retract from the one or more receiving portions 212 of the portable speaker 104 thereby releasing the portable speaker 104 from the dock 105. In examples, the dock 105 may include ejectors (or spring loaded ejectors) 306 configured to push the portable speaker 104 out of the dock 105. The spring loaded ejectors 306 may apply a constant force against the portable speaker 104 when the portable speaker 104 is in the docked state 208 and/or may be activated to push the portable speaker 104 out of the dock 105 by pressing the release button 206.

Figure 4:
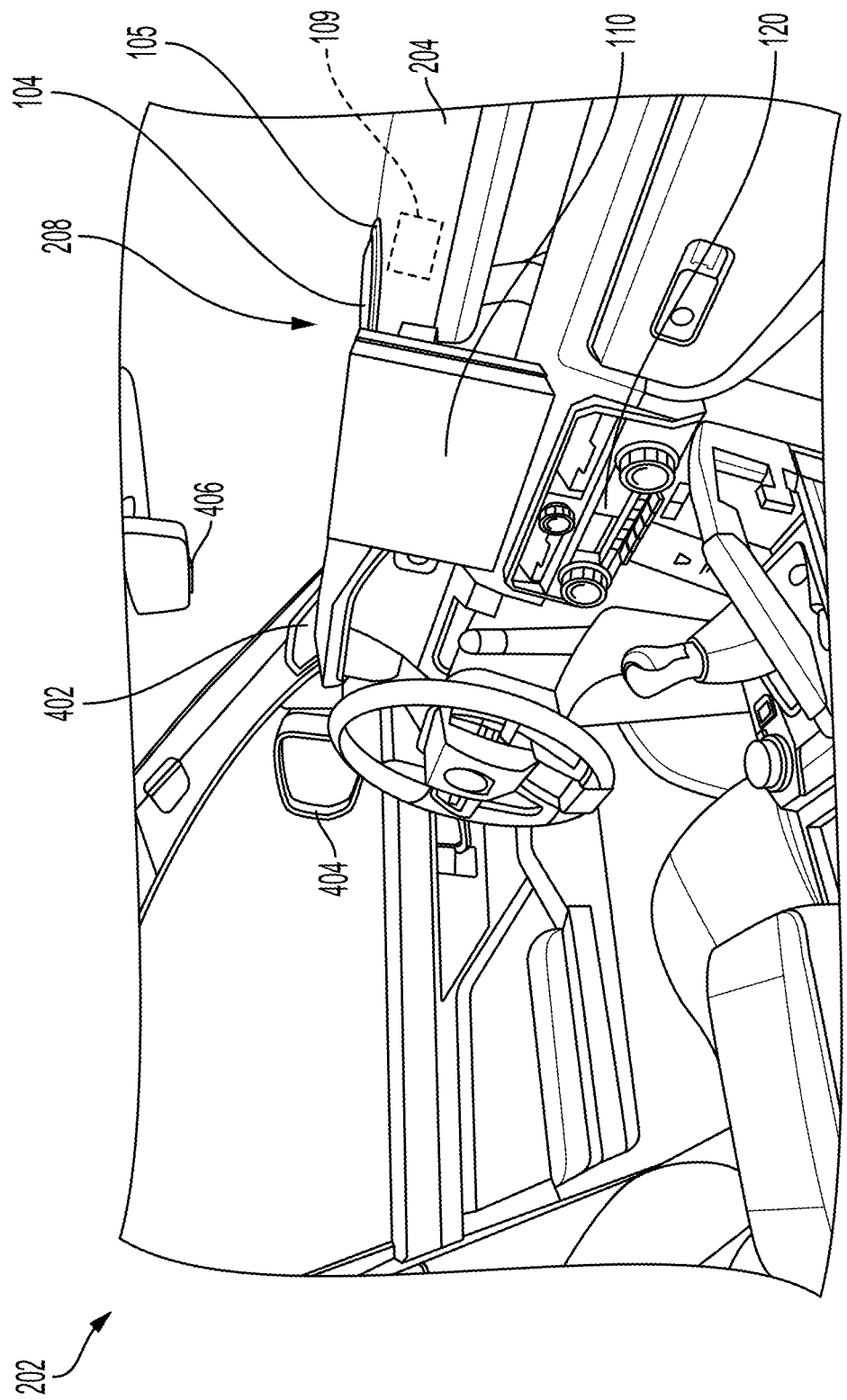
FIG. 4 is a schematic side view of a cabin of a vehicle including the example portable speaker security system of FIG. 1 according to an aspect of the disclosure.

FIG. 4 is a schematic side view of the cabin 202 of the vehicle 102 including the example portable speaker security system 100 of FIG. 1. With combined reference to FIGS. 1 and 4, the portable speaker security system 100 may further include a head unit 120. The head unit 120 may be located within and/or coupled to the dashboard 204. The head unit 120 may be electrically connected to the dock 105 and one or more speakers 402 of the vehicle 102. The head unit 120 may control the one or more speakers 402 and/or the portable speaker 104. For example, the head unit 120 may provide audio data and/or electrical energy to the one or more speakers 402 and/or may provide the audio data and/or the electrical energy to the portable speaker 104 via the dock 105 when the portable speaker 104 is in the docked state 208. In examples, when the portable speaker 104 is in the docked state 208, the head unit 120 may utilize the portable speaker 104 as a central channel such that the portable speaker 104 is included in the one or more speakers 402 of the vehicle 102. In examples, when the portable speaker 104 is disconnected from the dock 105, the head unit 120 may wireless provide the audio data to the portable speaker 104. The head unit 120 may further include one or more digital to analog converters (DACs) and/or one or more amplifiers to process and/or control the audio data. In examples, the head unit 120 may further include a microcontroller (or audio microcontroller) 122 for controlling the one or more speakers 402 and/or the portable speaker 104.

The portable speaker security system 100 may further include an impedance (or resistance) sensor (or circuit) 109. The impedance sensor 109 may be electrically connected to the head unit 120, the dock 105, and/or the portable speaker 104. In examples, the impedance sensor 109 may be included within the dashboard 204, the dock 105, and/or the head unit 120. The impedance sensor 109 may measure, detect, and/or determine an impedance of the portable speaker 104 and/or a circuit that is completed when the portable speaker 104 is electrically connected to the speaker dock 105. For example, when the portable speaker 104 is in the docked state 208—and therefore electrically connected to the dock 105—the impedance sensor 109 may detect an impedance of 1-10 ohms (in examples, the detected impedance may be between 1-100 ohms). When the portable speaker 104 is removed from the dock 105 such that the portable speaker 104 is not electrically connected to the dock 105 (i.e., the portable speaker 104 is in the undocked state 210), the impedance sensor 109 may detect an infinite and/or near infinite impedance because of an open circuit created by removing the portable speaker 104 from the dock 105 (e.g., an open circuit at and/or between the one or more terminals 304 of the dock 105).

The portable speaker security system 100 may further include one or more cameras 138. The one or more cameras 138 may be located within the cabin 202 and/or on an exterior of the vehicle 102. In examples, the one or more cameras 138 may be coupled to one or more side view mirrors 404, a rear view mirror 406, a ceiling of the cabin 202, and/or the dashboard 204 of the vehicle 102. The one or more cameras 138 may be a digital camera, an infrared thermal camera, and/or a night vision camera (e.g., utilizing active illumination and/or image intensification). The one or more cameras 138 may provide, capture, and/or record images and/or video of an area within the cabin 202 and/or a surrounding area of the vehicle 102.

The portable speaker security system 100 may further include a network access device 114. In examples, the network access device 114 may be a telematic control unit (TCU). The network access device 114 may include a communication port or channel, such as one or more of a Wi-Fi unit, a Bluetooth® unit, a Radio Frequency Identification (RFID) tag or reader, a DSRC unit, and/or a cellular network unit for accessing a network 140 (e.g., CDMA, GSM, 3G, 4G, 5G, etc.). The network access device 114 may transmit data to and receive data from devices and systems not directly connected to the vehicle 102. For example, an electronic control unit (ECU) 106 of the vehicle 102 may communicate with one or more user devices 142 (e.g., a key fob, a mobile device, phone, tablet, laptop, etc.) through the network access device 114. In examples, a user (e.g., the owner of the vehicle 102) may use the one or more user devices 142 to communicate with the ECU 106 to start the vehicle 102 and/or to activate/deactivate the portable speaker security system 100.

The portable speaker security system 100 may further include a navigation unit 118. The navigation unit 118 may provide vehicle information (or data) and/or navigational map information to the ECU 106. The navigation unit 118 may have and/or be connected to a Global Positioning System (GPS) device. The vehicle information may include a current position and/or location of the vehicle 102, a current time at the current position, a direction of travel, and/or a current speed of the vehicle 102.

The portable speaker security system 100 may further include one or more processors and/or microcontrollers, such as the electronic control unit (ECU) 106 and the microcontroller 122. The ECU 106 may be implemented as a single ECU or in multiple ECUs, with each ECU of the multiple ECUs controlling one or more components of the vehicle 102 and/or the portable speaker security system 100. The ECU 106 may be electrically connected to some or all of the components of the vehicle 102 and/or the portable speaker security system 100 via a local area network (LAN) such as, but not limited to, a vehicle bus utilizing one or more protocols (e.g., controller area network (CAN), local interconnect network (LIN), etc.). The ECU 106 may be electrically connected to the alarm device 136, the portable speaker 104, the dock 105, the head unit 120, the impedance sensor 109, the one or more cameras 138, the network access device 114, the navigation unit 118, a memory 108, and/or a user interface 110. The ECU 106 may include one or more processors (or controllers) specifically designed for controlling operations of the vehicle 102 such as accelerating, braking, etc. In examples, the ECU 106 may be and/or include the microcontroller 122 within the head unit 120.

The portable speaker security system 100 may monitor an electrical connection between the portable speaker 104 and the dock 105 to determine whether the portable speaker 104 has been removed from the dock 105. In examples, the electrical connection may be formed by the one or more terminals 304 of the dock 105 electrically connecting to the one or more terminals 216 of the portable speaker 104. To monitor the electrical connection, the impedance sensor 109 may continuously determine, measure, and/or detect an impedance of the portable speaker 104 and/or the impedance between the one or more terminals 304 of the dock 105 and/or between the one or more terminals 304 of the dock 105 and the one or more terminals 216 of the portable speaker 104. The impedance sensor 109 may output an impedance reading (or impedance data) corresponding to the impedance of the portable speaker 104 and/or the impedance between the one or more terminals 304 of the dock 105 and/or between the one or more terminals 304 and the one or more terminals 216 of the portable speaker 104) to the ECU 106 and/or the head unit 120.

The ECU 106 and/or the head unit 120 (e.g., the microcontroller 122 of the head unit 120) may receive the impedance reading and may indicate a disconnect in the electrical connection when the impedance reading is infinite and/or greater than an impedance threshold (i.e., when the portable speaker 104 is electrically disconnected from the dock 105). In response to the disconnect being indicated, the ECU 106 may transmit, via the network access device 114, a message (or information) to one or more user devices 142 (e.g., a portable electronic device or a phone of an owner of the vehicle 102) indicating the portable speaker 104 has been disconnected from the dock 105.

In examples, when the disconnect is indicated, the ECU 106 may record, via the one or more cameras 138, one or more images and/or one or more videos of the area within the cabin 202 and/or the surrounding area of the vehicle 102 to capture an image of the person who removed the portable speaker 104 from the dock 105. In examples, the message may include the one or more images and/or the one or more videos to allow a user of the one or more user devices 142 to see who removed the portable speaker 104 from the dock 105.

The portable speaker security system 100 may further include the memory 108. The memory 108 may be electrically connected to the ECU 106. In examples, the memory 108 may be communicatively coupled (e.g., via the network 140) to the ECU 106 such that the memory 108 is remote from the ECU 106 and/or the vehicle 102. In other examples, the memory 108 may be electrically connected to the ECU 106 and a remote memory may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, transmission gear information, etc.). In examples, the memory 108 may further store the images and/or the video captured by the one or more cameras 138. In the same and/or additional examples, the memory 108 may store the impedance threshold. The impedance threshold may be between 1-10 ohms and/or may be any impedance corresponding to the portable speaker 104 being in the undocked state 210. In one aspect, the impedance threshold may be about or a little over 50 ohms (e.g., 55 ohms) to indicate that the portable speaker 104 is connected to the dock 105.

The portable speaker security system 100 may further include the user interface 110. The user interface 110 may provide an interface to a user of the vehicle 102 to interact with and/or receive output from the ECU 106. The user interface 110 may have a user interface element, such as a screen and/or a touchscreen with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106.

In examples, the user interface 110 and/or the one or more user devices 142 may enable a user to change various settings of the portable speaker security system 100. For example, the user may set the portable speaker security system 100 to activate, via the ECU 106, the alarm device 136 when the disconnect is indicated. In another example, the user may set when the portable speaker security system 100 is active (i.e., monitoring the electrical connection between the dock 105 and the portable speaker 104). The user may set the portable speaker security system 100 to be active, for example, when the vehicle 102 is locked and/or when a key (e.g., a key card, a key fob, a mobile phone acting as a key, etc.) is not detected by the ECU 106 and/or within a predetermined range (e.g., 5 feet, 10 feet, 20 feet, etc.) of the vehicle 102. The user interface 110 and/or the one or more user devices 142 may further enable the user to enter a passcode to deactivate the portable speaker security system 100 and/or prevent the message from being transmitted to the one or more user devices 142 such that the user may remove the portable speaker 104 from the dock 105 without activating the portable speaker security system 100 and/or the alarm device 136. In examples, the user interface 110 and/or the one or more user devices 142 may further prompt the user to enter the passcode to deactivate the alarm device 136 after the alarm device 136 has been activated.

Figure 5:
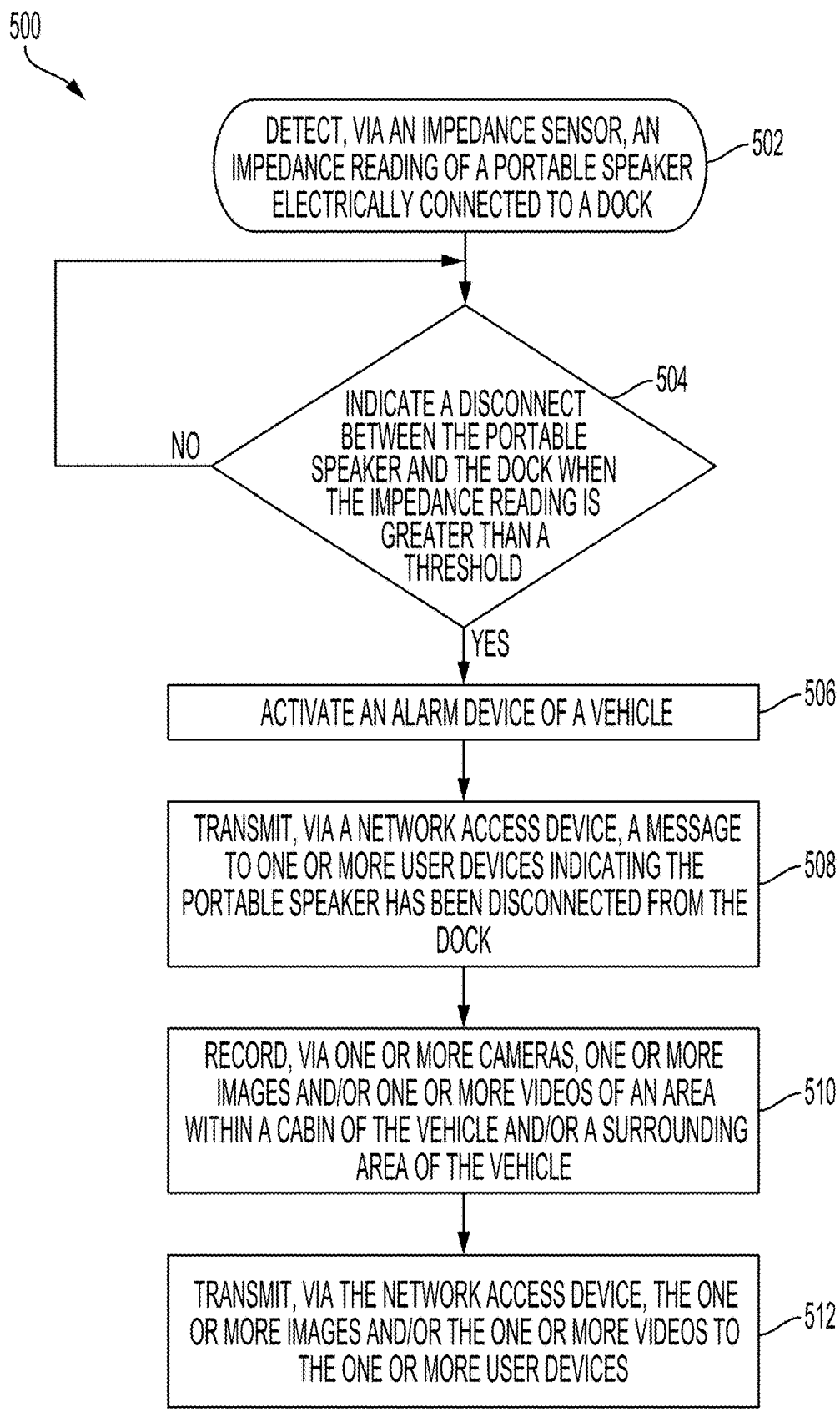
FIG. 5 is a flow diagram of an example process for controlling the portable speaker security system of FIG. 1 according to an aspect of the disclosure.

FIG. 5 is a flow diagram of an example process 500 for monitoring and/or securing a portable speaker of a vehicle. One or more computers or one or more data processing apparatuses, for example, the ECU 106 and/or the microcontroller 122 of the portable speaker security system 100 of FIG. 1, appropriately programmed, may implement the process 500. For ease of description, the process 500 is described below with reference to FIGS. 1, 2A, 2B, 3, and 4. The process 500 of the present disclosure, however, is not limited to use of the exemplary portable speaker security systems of FIGS. 1, 2A, 2B, 3, and 4.

The portable speaker security system 100 may detect and/or monitor, via the impedance sensor 109, an impedance reading of the portable speaker 104 electrically connected to the dock 105 (502). The impedance sensor 109 may output the impedance reading (or impedance data) corresponding to the impedance of the portable speaker 104 and/or the impedance between the one or more terminals 304 to the ECU 106 and/or the head unit 120.

The portable speaker security system 100 may indicate (e.g., via the ECU 106 and/or the head unit 120) a disconnect between the portable speaker 104 and the dock 105 when the impedance reading is greater than a threshold (or impedance threshold) (504). The threshold may be predetermined and may be stored in the memory 108. The threshold may be 1-500 ohms (or another impedance that corresponds to the portable speaker 104 being in the docked state 208 and electrically connected to the dock 105).

In response to the disconnect being indicated, the portable speaker security system 100 may activate the alarm device 136 of the vehicle 102.

The portable speaker security system 100 may transmit, via the network access device 114 a message (or information) to one or more user devices 142 (e.g., a phone of an owner of the vehicle 102) indicating the portable speaker 104 has been disconnected from the dock 105 (508). In examples, the message may include a user selectable option indicating the disconnect was unauthorized, with the alarm device 136 being activated upon, and not before, the portable speaker security system 100 receiving, via the network access device 114, data from the one or more user devices 142 indicating the disconnect was unauthorized (i.e., the user selectable option was selected by the user). In the same or additional examples, after receiving the data from the one or more user devices 142 indicating the disconnect was unauthorized, the portable speaker security system 100 may transmit another message to police indicating the portable speaker 104 has been stolen and indicating, via the navigation unit 118, a current location of the vehicle 102. In the same or additional examples, the message may include another user selectable option indicating the disconnect was authorized. When the another user selectable option is selected by the user, the portable speaker security system 100 may deactivate the alarm device 136 if the alarm device 136 has been activated and/or may prevent the alarm device 136 from being activated.

In examples, the portable speaker security system 100 may stop and/or prevent the message from being transmitted to the one or more user devices 142 when a key of the vehicle 102 is detected by the vehicle 102 and/or within a predetermined distance from the vehicle 102.

In examples, when the disconnect is indicated, the portable speaker security system 100 may record, via the one or more cameras 138, one or more images and/or one or more videos of the area within the cabin 202 of the vehicle 102 and/or the surrounding area of the vehicle 102 (510).

In examples, the portable speaker security system 100 may further transmit, via the network access device 114, the one or more images and/or the one or more videos to the one or more user devices 142 (512).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A portable speaker security system for a vehicle, comprising:
   a portable speaker;
   a speaker dock located on or within the vehicle and configured to hold the portable speaker and electrically connect to the portable speaker;
   a head unit electrically connected to the speaker dock and configured to:
      transmit audio data to the portable speaker through the speaker dock and/or wirelessly transmit the audio data to the portable speaker, and
      indicate a disconnect when the portable speaker is electrically disconnected from the speaker dock;
   a network access device configured to wirelessly communicate with at least one mobile device; and
   an electronic control unit (ECU) electrically connected to the speaker dock, the head unit, and the network access device and configured to:
      transmit, via the network access device, a message to the at least one mobile device indicating the portable speaker has been disconnected from the speaker dock when the disconnect is indicated.

2. The portable speaker security system of claim 1, further comprising at least one camera electrically connected to the ECU, wherein the ECU is further configured to:
   record, via the at least one camera, an image or a video of a surrounding area of the vehicle and/or an area within a cabin of the vehicle when the disconnect is indicated.

3. The portable speaker security system of claim 2, wherein the ECU is further configured to transmit, via the network access device, the image or the video to the at least one mobile device.

4. The portable speaker security system of claim 1, further comprising an alarm device electrically connected to the ECU and configured to generate sound when the alarm device is activated, wherein the ECU is further configured to:
   activate the alarm device when the disconnect is indicated.

5. The portable speaker security system of claim 1, further comprising an alarm device electrically connected to the ECU and configured to generate sound when the alarm device is activated, wherein:
   the message includes a user selectable option indicating the disconnect was unauthorized; and
   the ECU is further configured to:
      receive, via the network access device, data indicating the user selectable option was selected by a user, and
      activate the alarm device in response to receiving the data.

6. The portable speaker security system of claim 1, wherein:
   the message includes a user selectable option indicating the disconnect was unauthorized; and
   the ECU is further configured to:
      receive, via the network access device, data indicating the user selectable option was selected, and
      transmit another message to police indicating the portable speaker has been stolen in response to receiving the data.

7. The portable speaker system of claim 5, further comprising a navigation unit electrically connected to the ECU and configured to determine a current location of the vehicle, wherein the another message includes the current location of the vehicle.

8. The portable speaker security system of claim 1, further comprising an impedance sensor configured to detect an impedance reading of the portable speaker and/or a circuit that is completed when the portable speaker is electrically connected to the speaker dock, wherein the head unit is further configured to determine the portable speaker is electrically disconnected from the speaker dock when the impedance reading is greater than a threshold impedance.

9. The portable speaker security system of claim 1, wherein:
the ECU is further configured to stop transmitting the message to the at least one mobile device when a vehicle key is within a predetermined distance from the vehicle.

10. The portable speaker security system of claim 1, further comprising a user interface electrically connected to the ECU, wherein the ECU is further configured to:
display, via the user interface, a prompt to enter a passcode when the disconnect is indicated, and
stop transmitting the message to the at least one mobile device when the passcode is entered.

11. A portable speaker security system for a vehicle, comprising:
a portable speaker;
a speaker dock located on or within the vehicle and configured to hold the portable speaker and electrically connect to the portable speaker;
a network access device configured to wirelessly communicate with at least one mobile device;
at least one camera configured to record an image or a video of a surrounding area of the vehicle and/or an area within a cabin of the vehicle;
an electronic control unit (ECU) electrically connected to the speaker dock, the network access device, and the at least one camera and configured to:
indicate a disconnect when the portable speaker is electrically disconnected from the speaker dock,
record, via the at least one camera, the image or the video of the surrounding area of the vehicle and/or the area within the cabin of the vehicle when the disconnect is indicated, and
transmit, via the network access device, a message to the at least one mobile device indicating the portable speaker has been disconnected from the speaker dock when the disconnect is indicated.

12. The portable speaker security system of claim 11, wherein the ECU is further configured to transmit, via the network access device, the image or the video to the at least one mobile device.

13. The portable speaker security system of claim 11, further comprising an alarm device electrically connected to the ECU and configured to generate sound when the alarm device is activated, wherein the ECU is further configured to:
activate the alarm device when the disconnect is indicated.

14. The portable speaker security system of claim 11, further comprising an alarm device electrically connected to the ECU and configured to generate sound when the alarm device is activated, wherein:
the message includes a user selectable option indicating the disconnect was unauthorized; and
the ECU is further configured to:
receive, via the network access device, data indicating the user selectable option was selected by a user, and
activate the alarm in response to receiving the data.

15. The portable speaker security system of claim 11, wherein:
the message includes a user selectable option indicating the disconnect was unauthorized; and
the ECU is further configured to:
receive, via the network access device, data indicating the user selectable option was selected, and
transmit another message to police indicating the portable speaker has been stolen in response to receiving the data.

16. The portable speaker system of claim 15, further comprising a navigation unit electrically connected to the ECU and configured to determine a current location of the vehicle, wherein the another message includes the current location of the vehicle.

17. The portable speaker security system of claim 11, wherein:
the ECU is further configured to stop transmitting the message to the at least one mobile device when a vehicle key is within a predetermined distance from the vehicle.

18. The portable speaker security system of claim 11, further comprising a user interface electrically connected to the ECU, wherein the ECU is further configured to:
display, via the user interface, a prompt to enter a passcode when the disconnect is indicated, and
stop transmitting the message to the at least one mobile device when the passcode is entered.

19. The portable speaker security system of claim 11, further comprising:
a head unit electrically connected to the speaker dock and the ECU and configured to transmit audio data to the portable speaker through the speaker dock and/or wirelessly transmit the audio data to the portable speaker.

20. The portable speaker security system of claim 19, wherein:
the speaker dock includes at least two terminals configured to electrically connect to the portable speaker;
the head unit includes an impedance sensor configured to detect an impedance reading of the portable speaker and/or a circuit that is completed when the portable speaker is electrically connected to the dock; and
the ECU is further configured to determine the portable speaker is electrically disconnected from the speaker dock when the impedance reading is greater than a threshold impedance.

\* \* \* \* \*